(12) United States Patent  (10) Patent No.: US 7,621,590 B2
Philip  (45) Date of Patent: Nov. 24, 2009

(54) LOAD-CARRYING BED SYSTEM AND CONSTRUCTION

(75) Inventor: Ceby Philip, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/738,980

(22) Filed: Apr. 23, 2007

(65) Prior Publication Data

US 2008/0258488 A1 Oct. 23, 2008

(51) Int. Cl.
    B62D 33/02 (2006.01)
(52) U.S. Cl. .................................... 296/186.1; 296/39.2
(58) Field of Classification Search ............... 296/39.1, 296/39.2, 182.1, 183.1, 186.1
    See application file for complete search history.

(56) References Cited

U.S. PATENT DOCUMENTS

| | | | | |
|---|---|---|---|---|
| 3,306,654 A | * | 2/1967 | Curcio | 296/183.1 |
| 4,437,699 A | * | 3/1984 | Lewis et al. | 296/186.1 |
| 4,750,776 A | * | 6/1988 | Barben | 296/39.2 |
| 4,911,493 A | * | 3/1990 | Muirhead | 296/39.2 |
| 4,944,612 A | | 7/1990 | Abstetar et al. | |
| 4,974,895 A | * | 12/1990 | Davenport | 296/39.2 |
| 4,986,590 A | | 1/1991 | Patti et al. | |
| 5,041,318 A | | 8/1991 | Hulls | |
| 5,472,290 A | | 12/1995 | Hulls | |
| 5,540,473 A | | 7/1996 | Bills, Sr. | |
| 5,829,824 A | | 11/1998 | Yamamuro et al. | |
| 5,938,274 A | * | 8/1999 | Ehrlich | 296/191 |
| 5,997,076 A | * | 12/1999 | Ehrlich | 296/186.1 |
| 6,199,939 B1 | * | 3/2001 | Ehrlich | 52/582.1 |
| 6,450,567 B2 | | 9/2002 | Toba et al. | |
| 6,568,745 B2 | | 5/2003 | Kosuge et al. | |
| 6,739,647 B2 | * | 5/2004 | Obara et al. | 296/191 |
| 6,880,875 B2 | | 4/2005 | McClure et al. | |
| 6,883,851 B2 | | 4/2005 | McClure et al. | |
| 6,883,859 B2 | | 4/2005 | Edwards et al. | |
| 6,986,540 B2 | | 1/2006 | Augustine et al. | |
| 7,086,688 B2 | | 8/2006 | Edwards | |
| 2002/0149223 A1 | * | 10/2002 | Saucier et al. | 296/39.2 |
| 2006/0108831 A1 | * | 5/2006 | McClure et al. | 296/182.1 |

FOREIGN PATENT DOCUMENTS

JP 5-238422 9/1993

* cited by examiner

Primary Examiner—Dennis H Pedder
(74) Attorney, Agent, or Firm—Mark E. Duell; Rankin, Hill & Clark LLP

(57) ABSTRACT

A load-carrying bed system for attachment to a frame of a vehicle includes a headboard member adapted for securement to a first support component associated with the truck frame and a second separate support component associated with the truck frame. The second support component forms a portion of the frame along a lateral side of the vehicle. A left side wall member is adapted for securement to the second support component. A right side wall member is adapted for securement to the second support component. At least a portion of the headboard member overlaps at least a portion of the left side wall member and at least a portion of the right side wall member. The overlapping portions are secured to both the respective left and right side members and the second support component of the truck frame.

20 Claims, 6 Drawing Sheets

LOAD-CARRYING BED SYSTEM AND CONSTRUCTION

BACKGROUND

The present disclose generally relates to a load-carrying bed system and construction for a vehicle, and more particularly to an improved load-carrying bed system and construction having a headboard member secured to portions of the vehicle's frame disposed along lateral sides of the vehicle.

Vehicles having load-carrying beds (e.g., pickup trucks) are commonly used to facilitate transportation of cargo items from one location to another, such as through placement of cargo items in the bed. While vehicles with load-carrying beds are available in many sizes and configurations, a typical load-carrying bed vehicle includes a truck bed having a cargo carrying floor that can support cargo, such as lumber, rocks, groceries and/or other items. A typical truck bed also includes side walls to help restrain cargo within the bed. In many conventional truck beds, the cargo carrying floor and side walls are integrally provided, and can for example be formed as a single steel assembly and/or provided as a single plastic bed liner assembly.

A typical truck bed can further include a headboard structure. The headboard structure is a generally rectangular structure having a plurality of mounting apertures. The headboard structure is fastened to a forward wall via a plurality of fasteners, which can extend into the passenger compartment when the forward wall is a separating wall between the bed and the passenger compartment. While this type of headboard structure adds to the strength of the forward wall, the headboard structure, by itself, only partially resists the cargo impact forces.

Therefore, there is a need for an improved bed system that is relatively simply to install and functions adequately to support cargo within a truck bed in the event of a collision.

BRIEF DESCRIPTION

In accordance with one aspect, a load-carrying bed system for attachment to a frame of a vehicle comprises a headboard member adapted for securement to a first support component associated with the truck frame and a second separate support component associated with the truck frame. The second support component forms a portion of the frame along a lateral side of the vehicle. A left side wall member is adapted for securement to the second support component. A right side wall member is adapted for securement to the second support component. At least a portion of the headboard member overlaps at least a portion of the left side wall member and at least a portion of the right side wall member. The overlapping portions are secured to both the respective left and right side members and the second support component of the truck frame.

In accordance with another aspect, a load-carrying bed system for attachment to a frame of a truck comprises a headboard member including a base and first and second end sections extending outwardly from the base. The base is adapted for securement to a first support component associated with the truck frame. The first and second end sections are adapted for securement to respective left and right second support components associated with the truck frame. A left side wall member is adapted for securement to the left second support component forming a portion of the frame along one lateral side of the truck. A right side wall member is adapted for securement to the right second support component forming another portion of the frame along another lateral side of the truck. At least a portion of the first end section overlaps at least a portion of the left side wall member. At least a portion of the second end section overlaps at least a portion of the right side wall member. The first and second end sections each include at least one end section aperture in registry with at least one side member aperture located in the respective left and right side members and at least one second support component aperture located in the respective left and right second support components of the truck frame. At least one fastening member extends through the at least one end section, side member and second support component apertures. The at least one fastening member respectively secures the first and second end sections and the left and right side members to the left and right second support components.

In accordance with yet another aspect, a load-carrying bed system for attachment to a frame of a truck comprises a bed floor, a left side lining and a right side lining, and a headboard member. Each side lining extends upwardly from the bed floor and is adapted for securement to respective left and right wall components of the truck frame. The headboard member extends upwardly from the bed floor and between the left side lining and the right side lining. The headboard member includes a base and first and second arms. The base is adapted for securement to a front wall component of the truck frame which separates a passenger compartment from the bed system. The first arm extends from a first end portion of the base and is adapted for securement to the left side lining and the left wall component. The second arm extends from a second end portion of the base and is adapted for securement to the right side lining and the right wall component.

DETAILED DESCRIPTION

Figure 1:
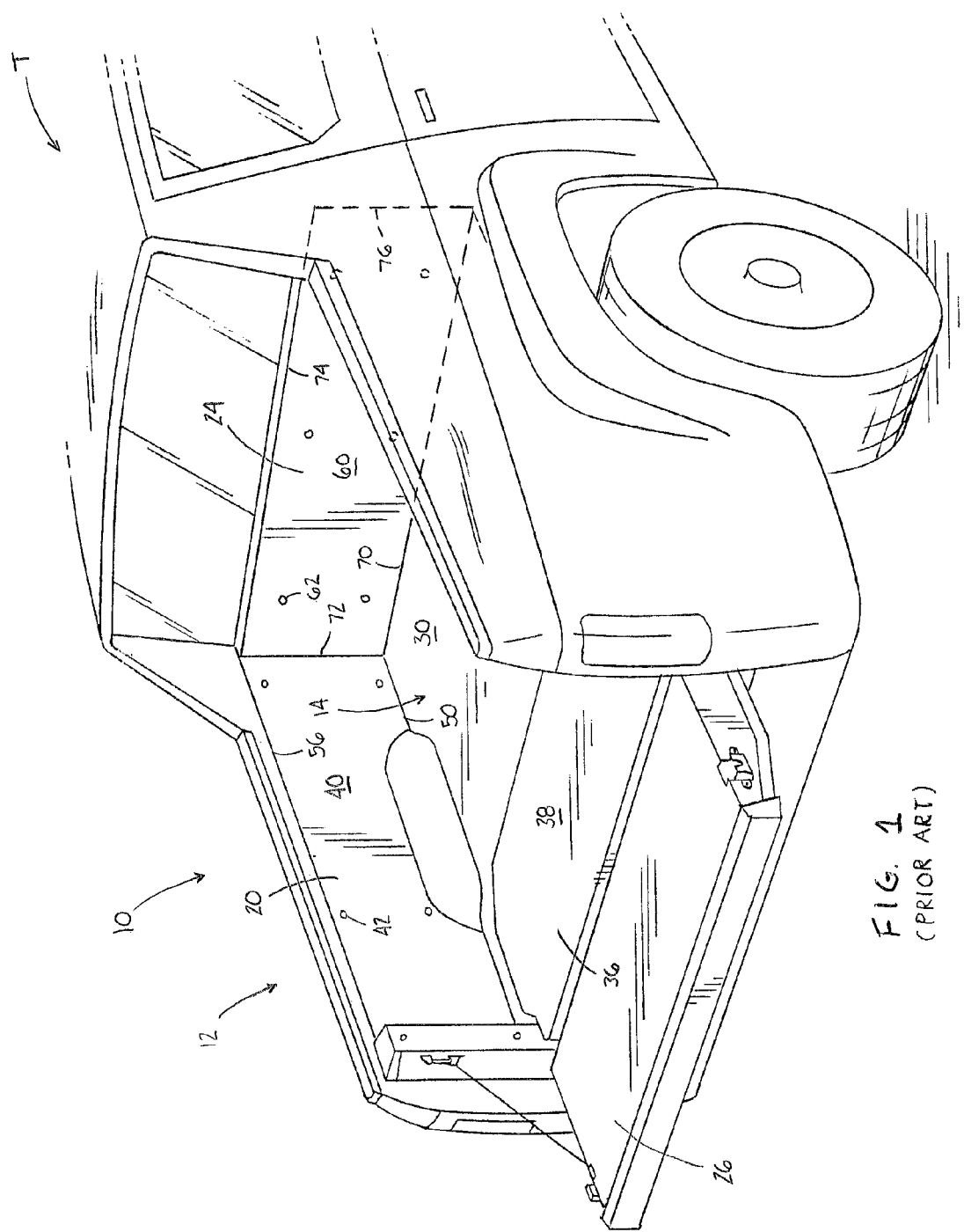
FIG. 1 is a perspective view of a conventional load-carrying bed system for a pickup truck, the bed system generally including a bed floor, a left side member, a right side member, a headboard member and a tailgate member.

It should, of course, be understood that the description and drawings herein are merely illustrative and that various modifications and changes can be made in the structures disclosed without departing from the spirit of the invention. It will also be appreciated that the various identified components of the load-carrying bed system are merely terms of art that may vary from one manufacturer to another and should not be deemed to limit the scope of the present disclosure. All references to direction and position, unless otherwise indicated, refer to the orientation of load-carrying bed system illustrated in the drawings and should not be construed as limiting the claims appended hereto.

Referring now to the drawings, wherein like numerals refer to like parts throughout the several views, FIG. 1 illustrates a conventional bed system 10 which is suitable for association with any of a variety of specific truck bed configurations, including for example, the truck bed portion 12. The bed system 10 includes a plurality of members and/or other components that are configured to directly contact and/or support cargo within the truck bed 12. More particularly, as shown in FIG. 1, the conventional bed system 10 can include a bed floor 14, a left side member or lining 20, a right side member or lining (not shown), a headboard member 24 and a tailgate member 26. The bed system 10 can also include left and right bed rail members (not shown). Each bed rail member can be configured to substantially conceal the interface between the outer body panel of the truck T and the side member for preventing cargo, dirt and moisture from accessing such interface.

Figure 4:
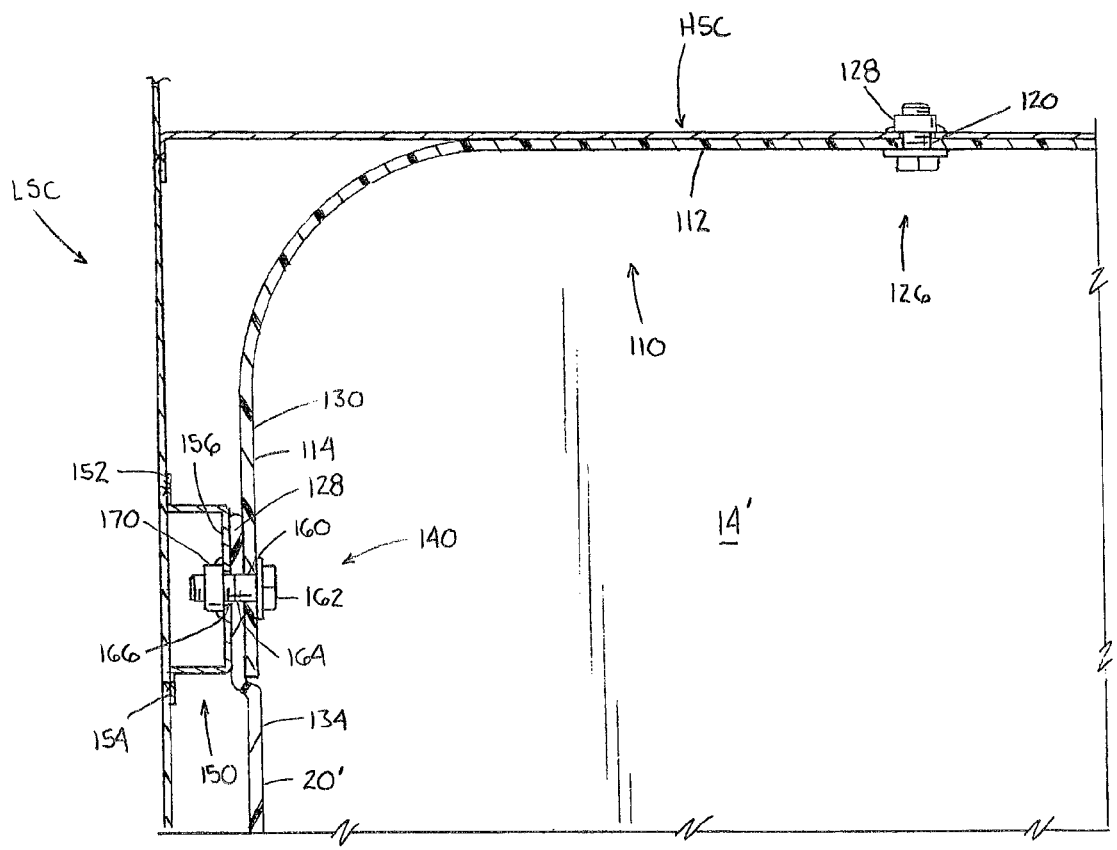
FIG. 4 is a partial cross-sectional view of a left side member and the headboard member of the bed system of FIG. 2 taken generally along the line 4-4.

Each of the members of the bed system 10 can be secured against and/or relative to one or more support components (e.g., the headboard support component HSC and the left support component LSC of the truck frame, as depicted in FIG. 4). A single support structure (not shown) can integrally provide one or more of these support components, and the support structure can be adapted for securement in a fixed position relative to a frame or unibody of the truck T. This securement might be accomplished through welds, bolts or other fastening, for example. The support structure can be integral with the truck's frame or unibody. Hence, each of the support components for the bed system can be integrally provided by the truck's frame or unibody. A suitable support component and/or support structure can comprise any of a variety of materials, including for example, plastic, fiberglass, steel, aluminum, a combination thereof, or the like.

The bed floor 14 is shown to include a first support surface 30 for contacting and thereby supporting cargo within the truck bed portion 12. The bed floor 14 can comprise a single member that provides substantially the entire cargo carrying floor of the truck bed portion 12. However, a plurality of separate members might be configured to each define a respective portion of the cargo carrying floor of the truck bed portion. For example, one or more of the separate members might be configured as a moveable closure member (e.g., cargo lid 36 shown in FIG. 1) to provide selective access to one or more chambers (not shown) disposed beneath the cargo carrying floor of the truck bed portion 12. Such a closure member can include a second support surface 38 for directly supporting cargo within the truck bed portion 12, wherein the second support surface can align substantially coplanar with one or more of the other surfaces of the cargo carrying floor (e.g., first support surface 30 of the bed floor 14) when the closure member is closed. Both the first closure member 36 and the bed floor 14 can include raised contours (not shown) for providing rigidity and/or texture to the cargo carrying floor.

The left side member 20 can include a surface 40 that is configured to directly contact cargo within the truck bed 12 and to assist in restraining the cargo within the truck bed 12. The left side member is depicted as having a plurality of spaced apart apertures 42 to facilitate the securement of the left side member 20 against a support component (e.g., the left support component LSC of the truck frame, as depicted in FIG. 4). However, it should be understood that one or more of these apertures might not be present, such as when certain alternate securement mechanisms (e.g., adhesives, screws, rivets, push-pins, or the like) are employed to secure the left side member in place. The left side member can include one or more edge portions extending at least partially along its outer periphery. For example, the left side member 20 has a lower edge portion 50, a left edge portion (not shown), a right edge portion (not shown), and an upper edge portion 56. Although the left side member 20 is depicted as comprising a single member extending vertically from the bed floor 14, and further extending horizontally from the headboard member 24 to a position adjacent to the rear of the truck bed portion 12, it should be understood that the left side member could alternatively comprise one or more separate members that are each respectively configured to vertically and/or horizontally span only a portion of the area covered by the illustrated left side member 20. Further, part or all of the left side member might be integral with the bed floor 14.

Since the features of the right side member are generally a mirror image of the left side member, detailed description thereof will be omitted for conciseness.

With continued reference to FIG. 1, the headboard member 24 can include a surface 60 that is configured to directly contact cargo within the truck bed 12 and to assist in restraining the cargo within the truck bed. The headboard member 24 can further include a plurality of spaced apart apertures 62 to facilitate the securement of the headboard member against a portion of the truck bed 12 (e.g., the headboard support component HSC of the truck frame as depicted in FIG. 4). The headboard member can include one or more edge portions extending at least partially along its outer periphery. For example, the headboard member is depicted in FIG. 1 being generally rectangular having a lower edge portion 70, a left edge portion 72, an upper edge portion 74, and a right edge portion 76. Part or all of the headboard member might be integral with the bed floor 14.

The individual components of the bed system can be formed from any of a variety of materials such as, for example, steel, aluminum, plastic, fiberglass, composites, and/or a combination thereof.

Figure 2:
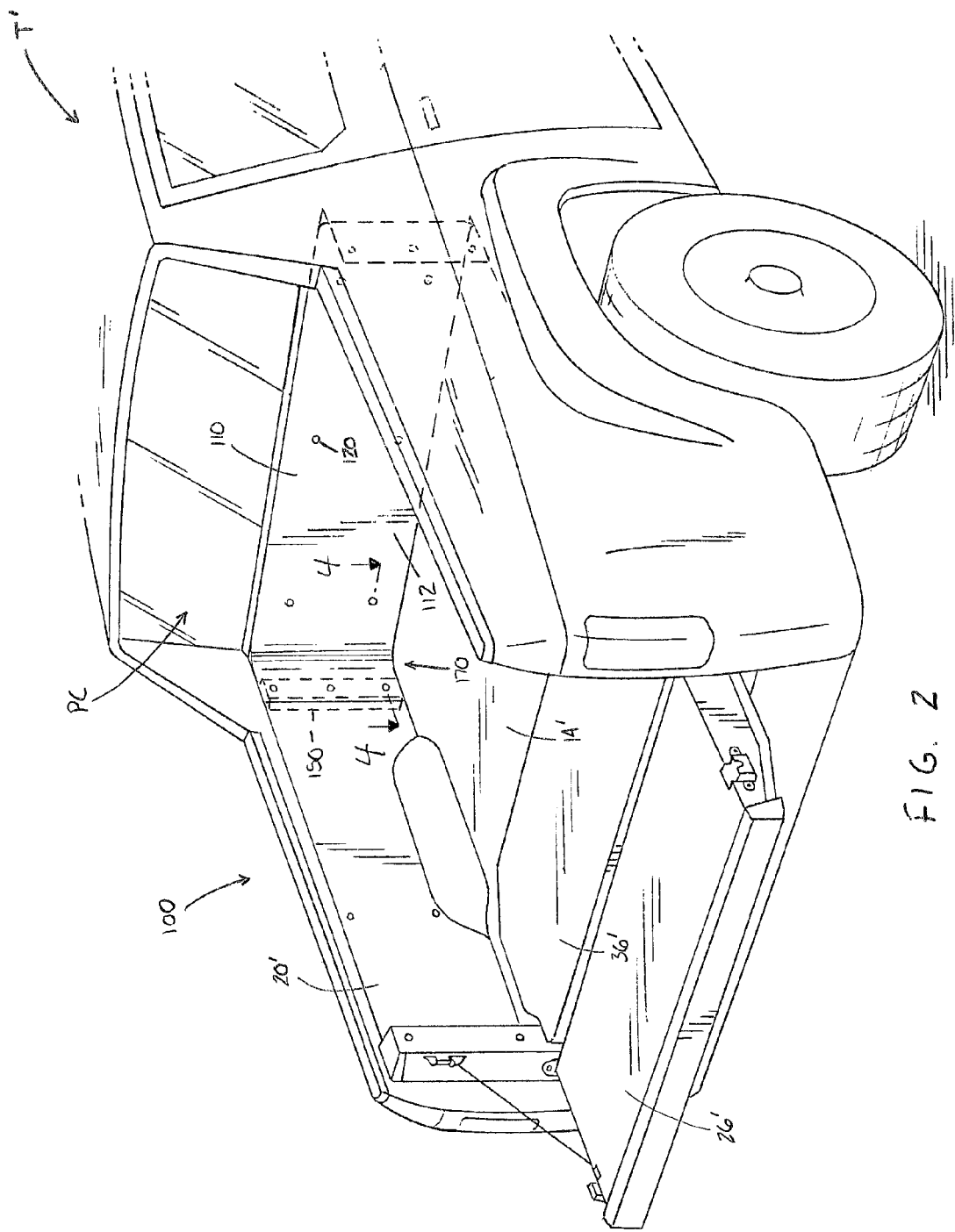
FIG. 2 is a perspective view of an improved load-carrying bed system for a pickup truck including a headboard member according to one aspect of the present disclosure.
Figure 3:
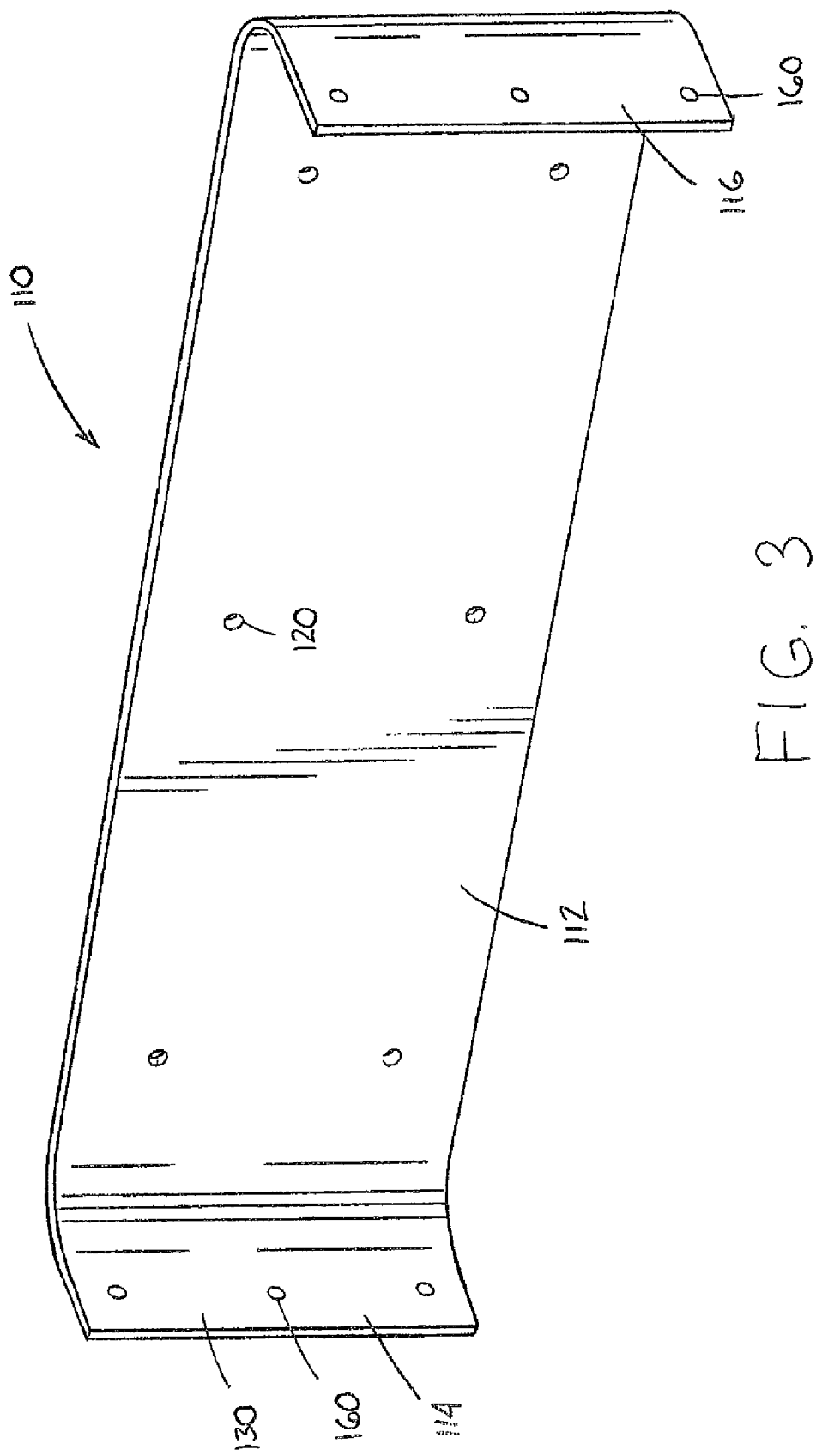
FIG. 3 is a perspective view of the headboard member of the bed system of FIG. 2.

With reference to FIGS. 2-4, an improved load-carrying bed system 100 according to the present disclosure is illustrated. The load-carrying bed system 100 is similar to the previous embodiment except for headboard member 110. As will be described in greater detail below, the headboard member 110 is adapted for securement to a first support component associated with the truck frame and a second support component associated with the truck frame which is disposed along lateral sides of the vehicle. In the bed system of FIGS. 2-4, reference numerals with a single primed suffix (') refer to like components of bed system 10 and will be explained in no more detail.

According to the present disclosure, the headboard member 110 is generally C-shaped and includes a base 112 and first and second end sections or arms 114 and 116, respectively, extending outwardly from the base. In the depicted embodiment, the end sections extend generally perpendicular from the base. While the base 112 of the headboard member 110 is depicted as comprising a single member extending vertically from the bed floor 14' to a position adjacent to the top of the truck bed portion 12', and further extending horizontally from the left side member 20' to the right side member, it should be understood that the headboard member could alternatively comprise one or more separate members that are each respectively configured to vertically and/or horizontally span only a portion of the area covered by the depicted headboard member.

The base 112 includes a plurality of spaced apart apertures 120 for securing the headboard member against the headboard support component HSC (i.e., the first support component) of the truck frame. Particularly, as depicted in FIG. 4, the base 112 of the headboard member 110 is shown to secure against the headboard support component HSC with a bolt 126 inserted through one of the apertures 120. The bolt threadedly engages a nut 128 that is welded or otherwise secured against the headboard support component HSC. However, one or more of these apertures 120 might not be present, such as when certain alternate securement mechanisms (e.g., adhesives, screws, rivets, push-pins, or the like) are employed to secure the headboard member 110 in place.

As indicated previously, the headboard support component HSC can be associated with a support structure (not shown) and is configured for securement in a fixed position relative to a frame or unibody of the truck T'. As shown, the headboard support component HSC can be integral with the truck frame and can be a single panel wall that separates a passenger compartment PC of the truck T' from the load-carrying bed system 100. While enclosing the passenger compartment, the headboard support component HSC must be rigid enough to withstand significant impact forces resulting from cargo in the truck bed 12' moving into the headboard support component, such as during a front end collision. As indicated previously, although the conventional headboard member 24 adds to the strength of the bed system 10, headboard member 24, by itself, only partially resists the cargo impact forces.

To further the strength of the bed system 100, the headboard member 110 includes the first and second end sections 114 and 116 which are configured to at least partially overlap at least end portions of the left and right side members, respectively. With particular reference to the left side of the bed system 100 (FIG. 4), end portion 128 of the left side member 20' can be offset such that an outer surface 130 of the first end section 114 is generally coplanar with an outer surface 134 of the left side member 20'. This overlapping section 140 of the headboard member 112 and the left side member is secured to the left support component LSC (i.e., the second support component) of the truck frame. A cushioning element (not shown) can be provided at the interface between the headboard member and the left side member to maintain a small spacing and to facilitate small movement therebetween.

The left support component LSC can also be associated with a support structure (not shown) and is configured for securement in a fixed position relative to a frame or unibody of the pickup truck T'. As shown in FIG. 4, a mounting structure 150 can be fastened with respect to the left support component and functions to facilitate secure attachment between the overlapping section 140 and the left support component LSC. The mounting structure can take the form of a reinforcement member to increase the structural integrity of the left support component, thereby deterring flexing when the bed system 100 is supporting a load. As shown, the mounting structure 150 is generally vertically disposed and may be fastened with respect to the left support component LSC, for example, by adhesives, welds, bolts, or other fastening techniques. The mounting structure has a general C-shaped cross section and includes lateral tabs 152, 154 mounted to a surface of the left support component and an outwardly extending mounting portion 156. Providing the mounting structure with a general C-shaped cross section increases the bending inertia of the mounting structure, thereby maximizing its effectiveness as a reinforcement structure.

The overlapping portions of the headboard member 110 include at least one headboard member aperture in registry with at least one side member aperture located in the respective left and right side members and at least one second support component aperture located in the respective second support components of the truck frame. The at least one apertures of the headboard member, side members and second support components are adapted to receive at least one fastening element. More particularly, as shown in FIG. 3, the first and second end section 114, 116 include a plurality of spaced apart apertures 160 for securing the respective end sections to the left and right side members and second support components of the truck frame. Particularly, and with reference again to FIG. 4 (which depicts the left side of the bed system 100) the overlapping section 140 of the headboard member 110 and the left side member 20' can be secured to the mounting structure 150 with a bolt 162 inserted through aligned apertures 160, 164, 166 located in the first end section 114, end portion 128 and mounting portion 156, respectively. The bolt 162 threadedly engages a nut 170 that is welded or otherwise secured against the mounting structure.

Although the depicted bed system 100 includes fasteners that are exemplified as a bolt and nut arrangement, it is understood that the fasteners described herein may alternatively comprise a wide variety of fastener types known in the industry that are capable of performing a tightening function. For example, the fasteners may comprise a bolt that can be mounted in a threaded aperture integrally formed with the support components of the truck frame. The fasteners may further comprise non-threaded fasteners, snap fasteners or other fasteners that can perform a tightening function.

Figure 5:
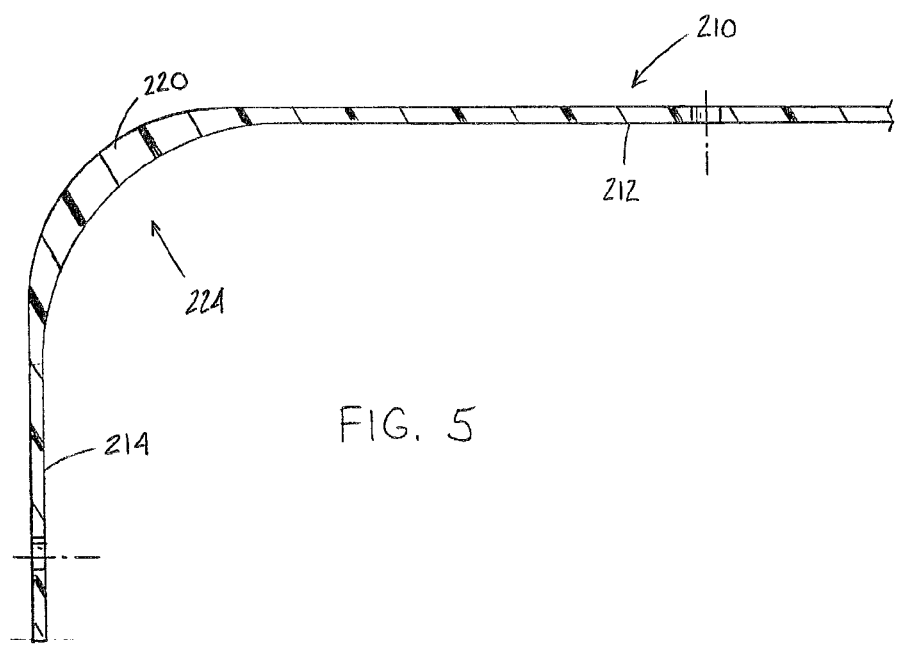
FIG. 5 is a partial cross-sectional view of a headboard member for the bed system of FIG. 2 according to a second aspect of the present disclosure.

An alternate embodiment of a headboard member 210 is shown in FIG. 5. Again, the headboard member includes a base 212 adapted for securement to a first headboard support component (not shown) associated with the truck frame and first and second end sections (only the left end section 214 is depicted) extending outwardly from the base and adapted for securement to respective left and right second support components (not shown) associated with the truck frame. In this embodiment, left and right, generally arcuate reinforcing members (only the left reinforcing member 220 is shown) are integrally formed with the headboard member 210 to provide rigidity to the headboard member and strength to critical corner areas 224 of the bed system 100. However, it should be appreciated that the reinforcing members can be separate members which are fixedly secured to the headboard member, such as by adhesives. The solid reinforcing members span between a top edge potion and a bottom edge portion of the headboard member and provide additional thickness to the corners 224.

Figure 6:
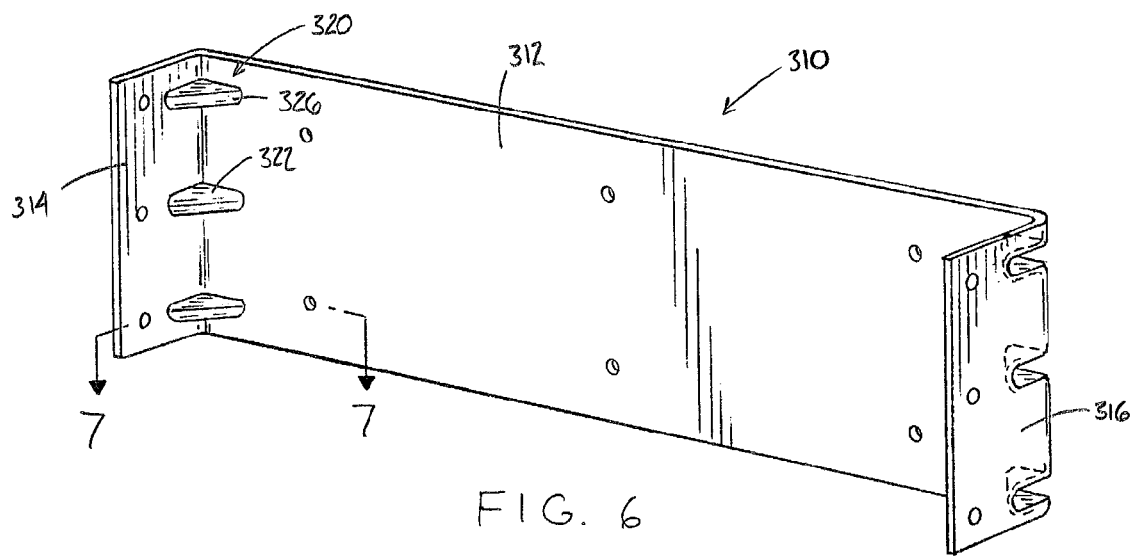
FIG. 6 is a perspective view of a headboard member for the bed system of FIG. 2 according to a third aspect of the present disclosure.
Figure 7:
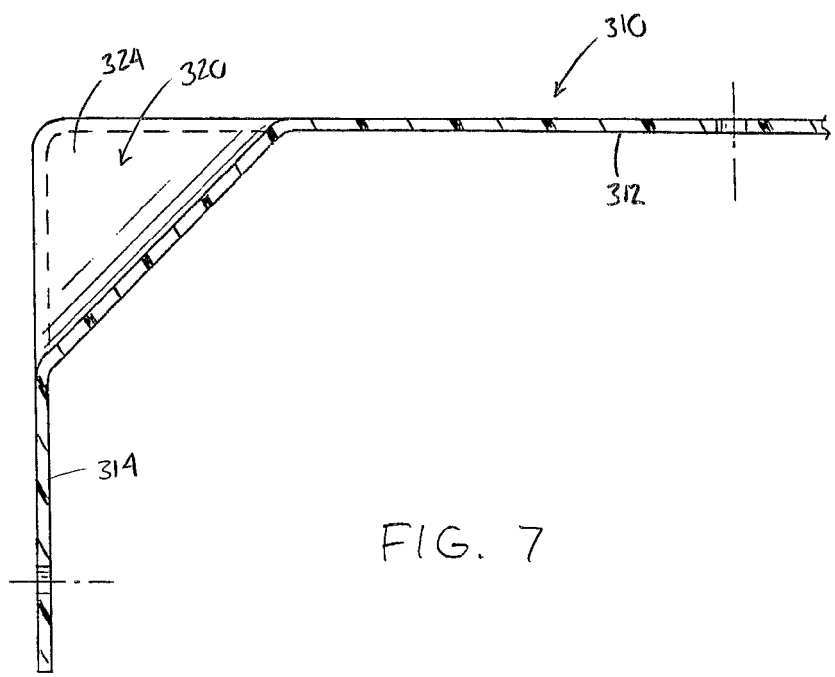
FIG. 7 is a partial cross-sectional view of the headboard member of FIG. 6 taken generally along the line 7-7.

An alternate embodiment of reinforcing members for a headboard member is shown in FIGS. 6 and 7. Similar to the previous embodiments, the headboard member 310 includes a base 312 adapted for securement to a front wall or headboard support component (not shown) of the truck frame which can separate a passenger compartment from the bed system. A first or left arm 314 extends outwardly from a first end portion of the base. The first arm is adapted for securement to the left side member and the left wall support component (not shown). A second or right arm 316 extends outwardly from a second end portion of the base. The second arm is adapted for securement to the right side member and a right wall support component (not shown).

A plurality of spaced apart, integrally formed reinforcing members 320 extend between the base and the respective first and second arms. The reinforcing members are generally triangular in cross-section; although, this is not required. The reinforcing members are generally hollow; although, this is not required. Each reinforcing member including a top wall 322, a bottom wall 324 and a front wall connecting the top and bottom walls. The reinforcing members provide rigidity to the headboard member 310.

Figure 8:
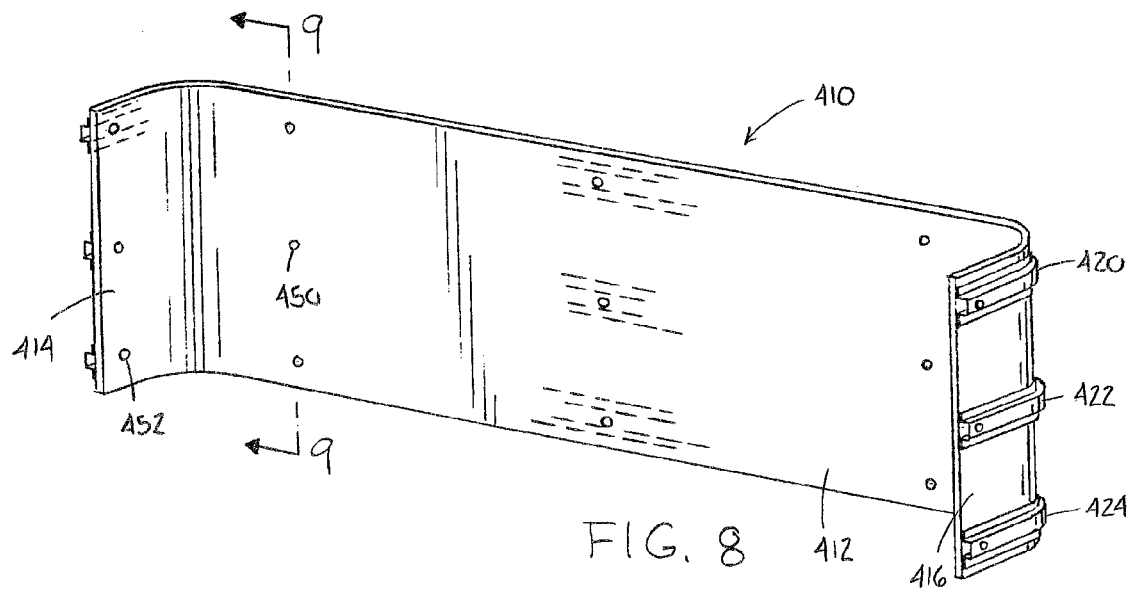
FIG. 8 is a perspective view of a headboard member for the bed system of FIG. 2 according to a fourth aspect of the present disclosure.
Figure 9:
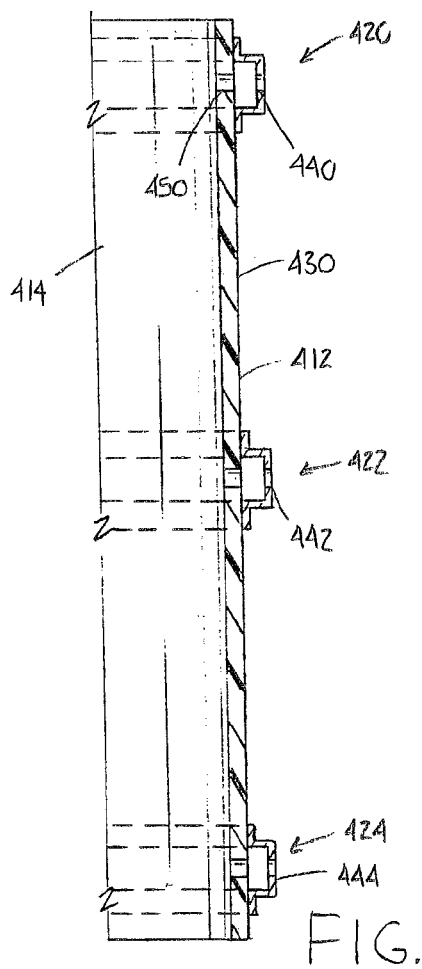
FIG. 9 is a partial cross-sectional view of the headboard member of FIG. 8 taken generally along the line 9-9.

Another alternate embodiment of reinforcing members for a headboard member is shown in FIGS. 8 and 9. Similar to the previous embodiments, the headboard member 410 includes a base 412 adapted for securement to a first headboard support component (not shown) associated with the truck frame and first and second end sections 414 and 416, respectively, extending outwardly from the base and adapted for securement to respective left and right second support components (not shown) associated with the truck frame.

Reinforcing members or support braces 420, 422, 424 horizontally span across a surface 430 of the headboard member, and are disposed between the headboard member and the support components (not shown) associated with the truck frame. The support braces can have a conformation similar to the headboard member and provide strength and rigidity to the headboard member. The support braces can be formed from any of a variety of materials such as metals, plastics, fiberglass, composites, combinations thereof, or the like. Each support brace 420, 422, 424 includes apertures 440, 442, 444, respectively, which register with respective openings 450,452 located on the base 412 and first and second end sections 414, 416 to facilitate the securement of the headboard member to the support components (not shown).

As shown in FIGS. 8 and 9, the support braces can take the form similar to mounting structure 150 to increase the structural integrity of the headboard member, thereby deterring flexing when the bed system 100 is supporting a load. As shown, the each support brace 420, 422, 424 may be fastened with respect to the headboard member 410, for example, by adhesives, welds, bolts, or other fastening techniques. It should be appreciated that the support braces can be integrally formed with the headboard member. Each support brace has a general C-shaped cross section to increase the bending inertia of the support brace, thereby maximizing its effectiveness as a reinforcement structure. While each support braces 420, 422, 424 of the headboard member 410 is depicted as a single member, it should be understood that each support brace could alternatively comprise separate members that are each respectively configured to span only a portion of the headboard member. It should also be appreciated that more or less than three support braces can be secured to the headboard member 410 to provide strength and rigidity to the headboard member.

The bed systems described herein are advantageous for providing a bed system that relatively simply to install and functions adequately to support cargo within a truck bed in the event of a collision. It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A load-carrying bed system for attachment to a frame of a truck, the bed system comprising:
a substantially rigid headboard member for securement to a first support component of the truck frame and opposed second and third separate support components of the truck frame, the first support component forming a portion of the frame along a forward portion of the truck, the second support component forming a portion of the frame along a lateral side of the truck, the third support component forming a portion of the frame along an opposed lateral side of the truck, each of the support components being fixedly and non-movably secured to the truck frame;
a substantially rigid left side wall member for securement to the second support component;
and a substantially rigid right side wall member for securement to the third support component,
wherein at least a portion of the headboard member overlaps at least a portion of the left side wall member and at least a portion of the right side wall member, the overlapping portions being secured to both the respective left and right side members and the respective second and third support components of the truck frame,
wherein an inwardly facing surface of each overlapping portion defines a respective first plane and an inwardly facing surface of each left and right side wall member defines a respective second plane which is substantially coplanar with the first plane.

2. The bed system of claim 1, wherein the headboard member including a base and first and second end sections extending outwardly from the base.

3. The bed system of claim 2, wherein the headboard member is generally C-shaped.

4. The bed system of claim 2, further including at least one reinforcing member secured to the headboard member and extending between the base and the respective first and second end sections to provide rigidity to the headboard member and strength to critical corner areas of the bed system.

5. The bed system of claim 2, further including at least one reinforcing member secured to the headboard member and extending between the base and the respective first and second end sections, the at least one reinforcing member for securement to at least one of the first and second support components.

6. The bed system of claim 1, further including at least one reinforcing member integrally formed with the overlapping portions of the headboard member to provide rigidity to the headboard member.

7. The bed system of claim 6, wherein the at least one reinforcing member is for securement to at least one of the first and second support components.

8. The bed system of claim 1, wherein the overlapping portions of the headboard member include at least one headboard member aperture in registry with at least one side member aperture located in the respective left and right side members and at least one second support component aperture located in the respective second support components of the truck frame, at least one fastening element received through the at least one headboard member aperture, the at least one side member aperture, and the at least one second support component aperture.

9. The bed system of claim 1, wherein the first support component is integral with the frame of the truck.

10. The bed system of claim 9, wherein each of the second support component and third support component is integral with the frame of the truck and extends outwardly from the first support component.

11. A load-carrying bed system for attachment to a frame of a truck, the bed system comprising:
a substantially rigid headboard member including a base for securement to a first support component of the truck frame and first and second end sections extending outwardly from the base for securement to respective left and right second support components of the truck frame;

a substantially rigid left side wall member for securement to the left second support component forming a portion of the frame along one lateral side of the truck; and a substantially rigid right side wall member for securement to the right second support component forming another portion of the frame along another lateral side of the truck, wherein at least a portion of the first end section overlaps at least a portion of the inwardly facing left side wall member and at least a portion of the second end section overlaps at least a portion of the inwardly facing right side wall member, and wherein the first and second end sections each include at least one end section aperture in registry with at least one side member aperture located in the respective left and right side members and at least one second support component aperture located in the respective left and right second support components of the truck frame, wherein at least one fastening member extends through the at least one end section, side member and second support component apertures, the at least one fastening member respectively securing the first and second end sections and the left and right side members to the left and right second support components, wherein the first and second support components are non-movable relative to the truck frame and are integral with the truck frame.

12. The bed system of claim 11, further including at least one reinforcing member secured to the headboard member and extending between the base and the respective first and second end sections, the at least one reinforcing member providing rigidity to the headboard member.

13. The bed system of claim 12, wherein the at least one reinforcing member is integrally formed with the headboard member.

14. The bed assembly of claim 11, wherein the first and second end sections extend from the base and are oriented approximately normal relative thereto.

15. A load-carrying bed system for attachment to a frame of a truck, the bed system comprising:
   a bed floor;
   a left side lining and a right side lining, each side lining extending upwardly from the bed floor for securement to respective left and right wall components of the truck frame; and
   a headboard member extending upwardly from the bed floor and between the left side lining and the right side lining, the headboard member including:
      a base for securement to a front wall component of the truck frame which separates a passenger compartment from the bed system,
      a first arm extending perpendicularly from a first end portion of the base for securement to the left side lining and the left wall component, the first arm, left side lining and bed floor together defining a first generally rectangular corner of the bed system, and
      a second arm extending perpendicularly from a second end portion of the base for securement to the right side lining and the right wall component, the second arm, right side lining and bed floor together defining a second generally rectangular corner of the bed system.

16. The bed system of claim 15, wherein the headboard member further includes at least one reinforcement member secured to and extending between the base and the respective first and second arms.

17. The bed system of claim 16, wherein the at least one reinforcing member is integrally formed with the headboard member.

18. The bed system of claim 16, wherein the at least one reinforcing member is for securement to at least one of the wall components.

19. The bed system of claim 15, wherein the first and second arms each include at least one aperture in registry with at least one aperture located in the respective left and right side linings and at least one aperture located in the respective left and right wall components of the truck frame, wherein at least one fastening member extends through the at least one apertures, the at least one fastening member securing the first and second arms and the left and right side linings to the left and right wall components.

20. The bed assembly of claim 11, wherein the portion of the left side wall member is offset such that an inwardly facing surface of the first end section is substantially coplanar with the inwardly facing surface of the left side wall member, and the portion of the right side wall member is offset such that an inwardly facing surface of the second end section is substantially coplanar with the inwardly facing surface of the right side wall member.

* * * * *